United States Patent [19]
Berner et al.

[11] Patent Number: 4,637,196
[45] Date of Patent: Jan. 20, 1987

[54] MACHINE HOUSING

[75] Inventors: Erwin Berner, Waiblingen; Hans-Dieter Zettel, Waiblingen-Beinstein, both of Fed. Rep. of Germany

[73] Assignee: Robert Bosch GmbH, Stuttgart, Fed. Rep. of Germany

[21] Appl. No.: 646,994

[22] Filed: Sep. 4, 1984

[30] Foreign Application Priority Data

Oct. 13, 1983 [DE] Fed. Rep. of Germany ....... 3337218

[51] Int. Cl.[4] .............................................. B65B 57/00
[52] U.S. Cl. ....................................... 53/77; 493/478; 312/257 A
[58] Field of Search ..................... 53/52, 77, 201, 507; 70/102; 160/353, 369; 248/225.31, 231.7; 292/338; D8/354, 355; 312/109, 111, 138 R, 257 A, 257 S M; 493/478, 479

[56] References Cited

U.S. PATENT DOCUMENTS

| | | | |
|---|---|---|---|
| D. 182,603 | 4/1958 | Liecht et al. | D8/355 |
| 2,624,405 | 1/1953 | Lynch | 160/353 |
| 2,843,855 | 7/1958 | Hammer | 248/355 X |
| 2,883,814 | 4/1959 | Haab | 53/201 |
| 3,063,768 | 11/1962 | Moore | 312/111 |
| 3,353,888 | 11/1967 | Pritelli | 312/111 X |
| 3,403,953 | 10/1968 | Clark | 312/111 X |
| 3,877,764 | 4/1975 | Hillier | 312/111 X |
| 4,074,486 | 2/1978 | Grearson | D8/354 X |
| 4,306,399 | 12/1981 | Tsujimoto | 53/52 |
| 4,400,928 | 8/1983 | Watanabe | 53/77 X |

FOREIGN PATENT DOCUMENTS 835452 6/1960 United Kingdom ............. 248/231.7

Primary Examiner—John Sipos
Assistant Examiner—Steven P. Weihrouch
Attorney, Agent, or Firm—Edwin E. Greigg

[57] ABSTRACT

In order to protect operating personnel from injury and to facilitate access, a machine housing has a plurality of wall portions, such as plates and doors. In order to facilitate rapid mounting of these wall portions, horizontally offstanding L-angle brackets forming ribs are disposed on the frame of the machine, and grooved clamping elements are provided that can be firmly clamped to the ribs via screw fasteners. The wall portions are joined with these clamping elements.

9 Claims, 4 Drawing Figures

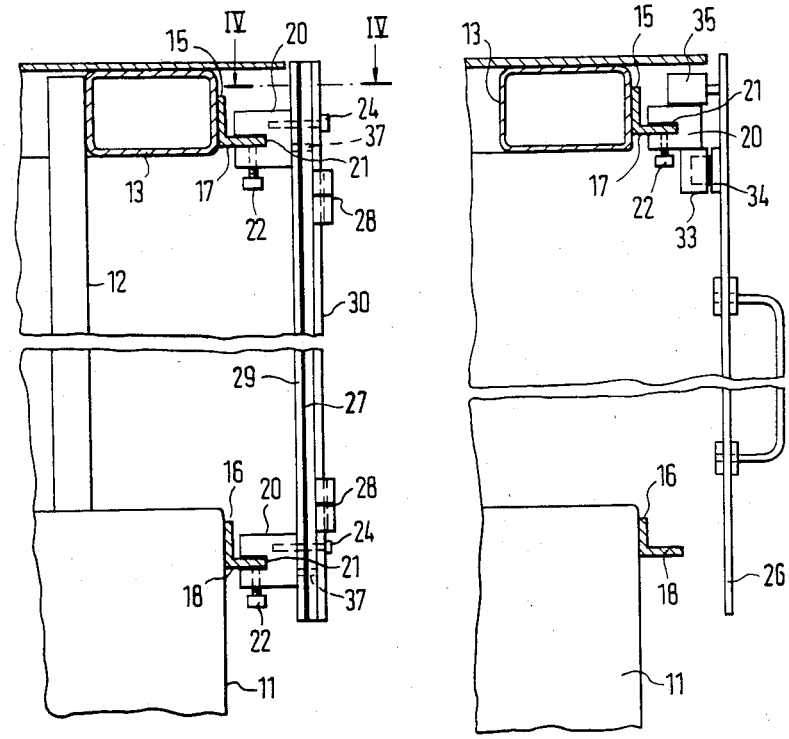
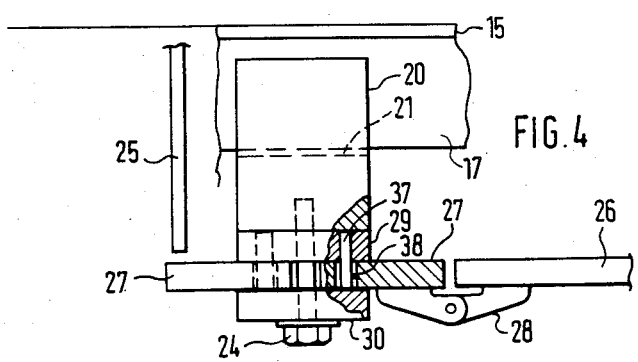

MACHINE HOUSING

BACKGROUND OF THE INVENTION

For machines, such as packaging machines, having movable tools, conveyor apparatus and the like, safety considerations have led to regulations requiring that the movable parts of machines be restricted from inadvertent or accidental access by operating personnel so as to protect the latter from injury. Such machines therefore have housings, linings and coverings with fixed wall elements, lids and doors. As a rule these elements, or their hinges, are screwed firmly to the machine frame. The assembly of such a housing represents a considerable expenditure of labor, which is particularly high because the individual parts of the housino must be adapted to one another.

OBJECT AND SUMMARY OF THE INVENTION

It is an object of the invention to provide a machine housing having the advantage that the assembly of the wall elements can be performed in a very short time, without effecting the normal burr or chip-removing machining operations, such as hole drilling.

It is another object of the invention to provide a machine housing the wall elements of which can be oriented properly to one another quite readily to assist in rapid assembly.

It is still another object of the invention to provide a machine housing having a variable grid layout on the wall elements allowing adaptation to many formats in the processing stations of the machine.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 shows a portion of the machine housing of FIG. 1 on an enlarged scale, in a cross section taken along the plane II—II of FIG. 1;

FIG. 3 shows another portion of the machine housing of FIG. 1, also on an enlarged scale, in a cross section taken along the plate III—III of FIG. 1; and FIG. 4 is a plan view of a portion of the machine housing, partially in section, the section being taken along the plane IV—IV of FIG. 2.

DESCRIPTION OF THE PREFERRED EMBODIMENT

Figure 1:
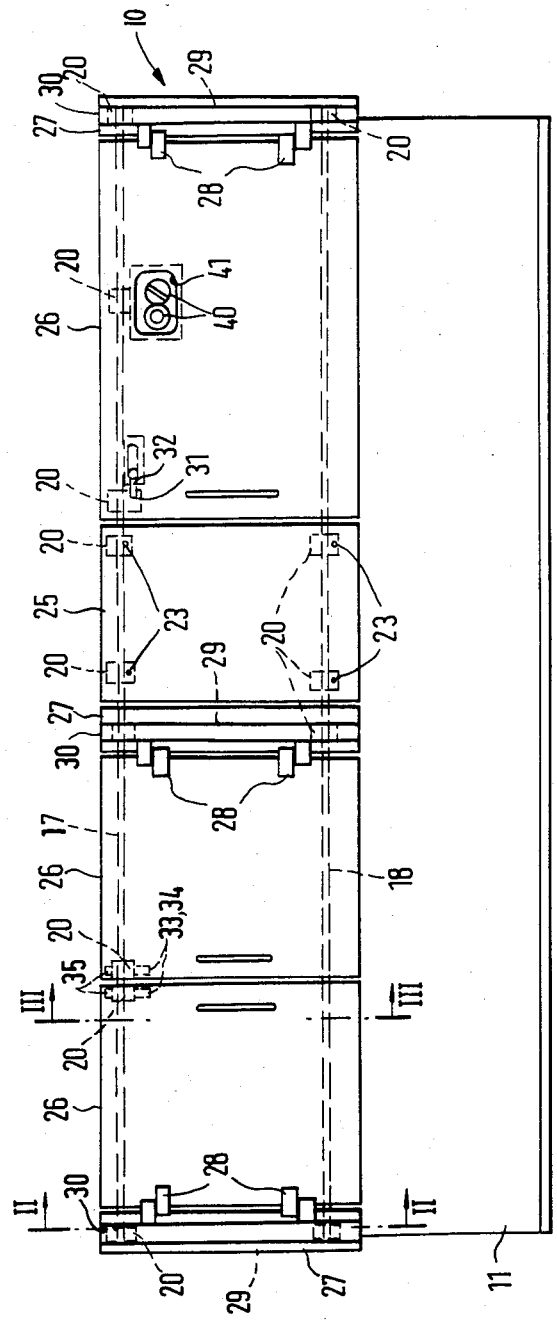
FIG. 1, in simplified form, shows a machine housing in a front elevational view.

Referring initially to FIG. 1, there is shown a machine, for instance a packaging machine, having movable parts such as tools, conveyor apparatus and the like, provided with a housing 10, to prevent access, with wall portions indicated as 25, 26, and 27 some of which are fixed and others of which can be opened. These wall elements are secured to the frame of the machine, which comprises a compact base frame 11 and a framework structure 13 supported above it on columns 12.

As best shown in FIG. 2, L-angle brackets 15, 16 are secured one above the other on the side of the base frame 11 and framework structure 13 such that one flange 17, 18 of each L-angle bracket off-stands horizontally away from the frame in rib-like fashion. The flanges 17, 18, which lay axially coincident in plan view [those in front hiding those behind them], extend in two horizontal planes in spaced relation with one another at a predetermined distance. Clamping elements 20 can be clamped firmly to the free flanges 17, 18 at arbitrarily selected locations. To this end, the blocklike clamping elements 20 have a groove 21, the width of which is somewhat larger than the thickness of the flanges 17, 18. One clamping screw 22 is disposed in a threaded bore in each of the clamping elements and extends through the groove 21 to retain the flanges therein. Once the clamping elements 20 and the groove 21 have been put in place and the clamping screws 22 have been tightened, the clamping elements 20 assume a fixed position on the machine frame. The individual wall portions, comprising plates 25, doors 26, support strips 27 and the like can be connected with the clamping elements 20. Preferably these parts are secured to the clamping elements 20 before the clamping elements 20 are mounted on the machine frame. Rigidly secured plates 25, which cover areas of the machine where quick access is not required, are joined directly to the clamping elements 20 or connected with them by means of securing screws 23. Doors 26, which are associated with areas of the machine where quick access is sometimes required, are pivotably connected to support strips 27 by means of hinges 28. These support strips 27 may, like the plates, be rigidly secured directly to the clamping elements 20.

As best shown in FIG. 4, in order to be able to adjust the doors 26 easily, the support strips 27 are firmly clamped to a strut 29 by means of a covering strip 30. The struts 29 have the same height as the plates 25, doors 26 and support strips 27, and they are connected to the clamping elements 20 by welding or securing screws. Two support strips 27 at a time preferably abut one another on one strut 29, in such spaced apart relation from one another as to provide room for clamping screws 24 to pass through the covering strip 30 and be screwed to the strut 29. For easy mounting of the support strips 27 and doors 26, the struts 29 have pins 37 on which the support strips 27, provided with correspondingly disposed bores 38, can initially be aligned and suspended and only then firmly clamped to the covering strips 30. The diameter of the bores 38 is larger than that of the pins 37.

Referring again to FIG. 1, one can see that to keep the doors 26 closed, detents 31 for latches 32 and magnetic holders 33 for armatures 34 are provided by securing the same on separately disposed clamping elements 20. Also secured to such clamping elements 20 are safety switches 35, which are actuated by the doors 26 so that if one of the doors opens, the machine is shut off immediately. In addition, electric operating elements such as control switches 40 may also be secured to such clamping elements, being accessible through recesses 41 in the doors 26 or plates 24. Other parts besides those parts of the housing described above can also be secured reliably and rapidly to the machine frame as needed, using the clamping elements described above.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. In a machine housing having a frame (11) and wall portions (25, 26) the improvement comprising at least a pair of horizontally disposed vertically spaced angle brackets (17, 18) having offstanding edge portions (21), clamping elements (20) for each said vertically spaced angle bracket provided with slot means adapted to receive said offstanding edge portions of said angle brackets, perforated strut means (29) interconnecting said vertically spaced clamping elements and positioned perpendicularly thereto, at least one perforated support strip (27) adapted to support said wall portions, means to attach said support strip to said strut means, and bolt means to releasably secure said support strip and said strut means to said clamping elements.

2. A machine housing as defined by claim 1, further wherein one of said wall portions is pivotably connected via a hinge with said at least one perforated support strip.

3. A machine housing as defined by claim 2, further wherein said at least one support strip is firmly clamped to said strut by means of a covering strip (30).

4. A machine housing as defined by claim 3, further wherein said at least one support strip comprises a pair of said support strips.

5. A machine housing as defined by claim 1, further wherein said clamping elements include machine shut-off means operable automatically upon a door being opened.

6. A machine housing as defined by claim 5, further wherein said machine shut-off means includes safety switches on said clamping elements operative to shut down said machine when said door is opened.

7. A machine housing as define by claim 5, further wherein said clamping elements include detent means and said door includes latch means cooperative therewith.

8. A machine housing as defined by claim 5, further wherein said clamping elements include magnetic holders and said door includes armature means cooperative therewith.

9. A machine housing as defined by claim 1, further wherein said clamping elements are provided with operating elements accessible to use through recesses in said wall portions.

* * * * *